Dec. 25, 1923.
G. W. NASH
1,478,989
BALL COCK
Filed June 11, 1921   2 Sheets-Sheet 1
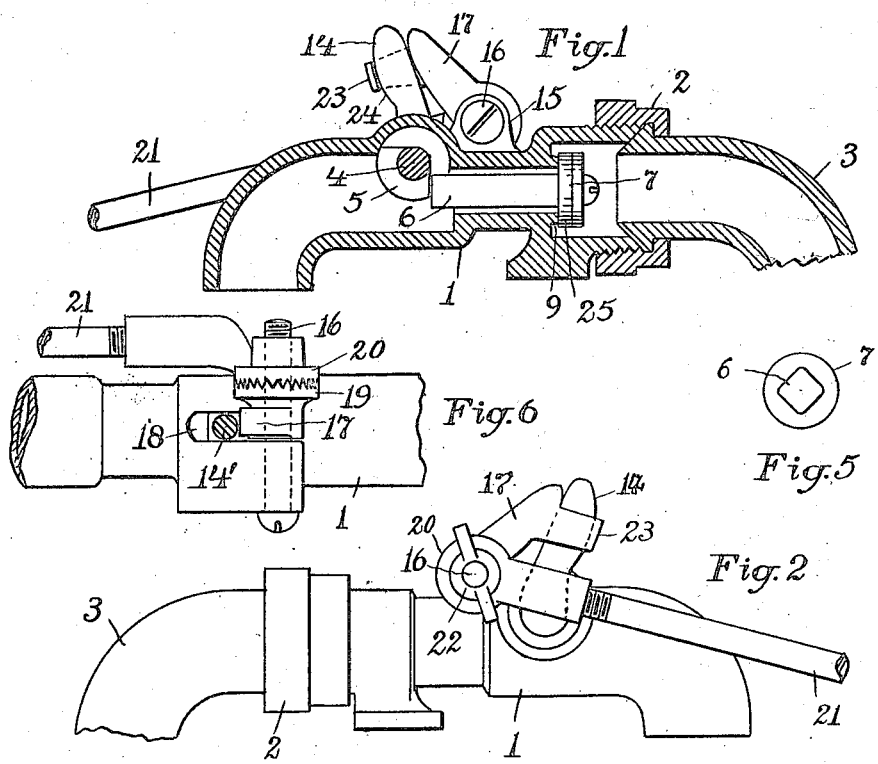
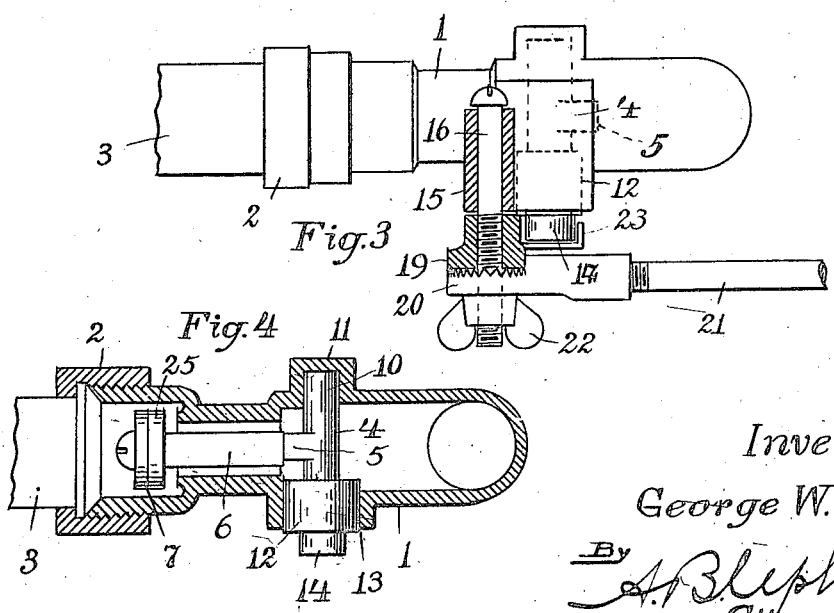
Inventor,
George W. Nash;
By A. B. Lipham,
Attorney.

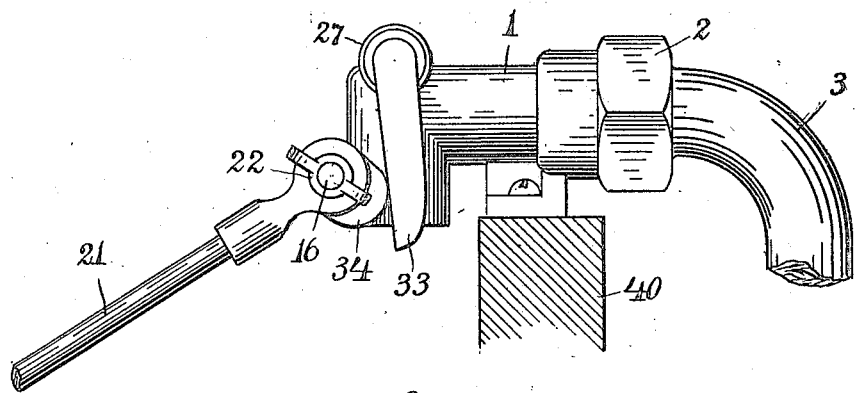
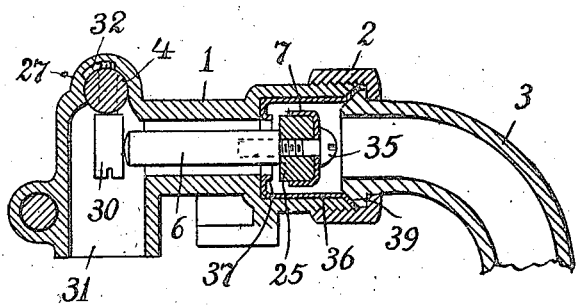
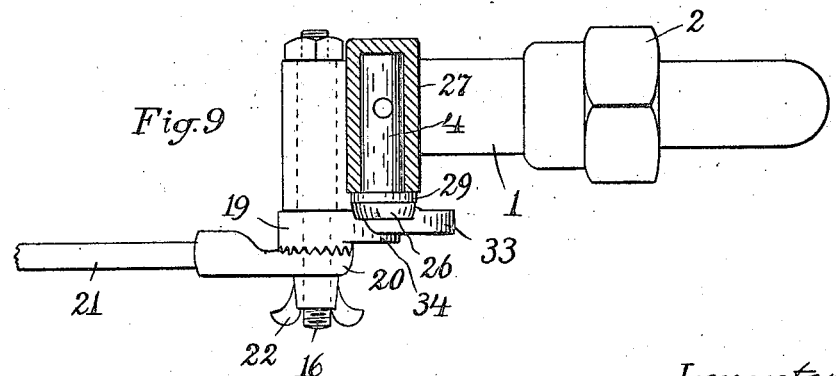

Patented Dec. 25, 1923.

1,478,989

UNITED STATES PATENT OFFICE.

GEORGE W. NASH, OF CHELSEA, MASSACHUSETTS.

BALL COCK.

Application filed June 11, 1921. Serial No. 476,727.

*To all whom it may concern:*

Be it known that I, GEORGE W. NASH, a citizen of the United States, and a resident of Chelsea, in the county of Suffolk and Commonwealth of Massachusetts, have invented certain new and useful Improvements in Ball Cocks, of which the following is a full, clear, and exact specification.

One of the great difficulties encountered in ball cocks, or float valves as they are often called, is the vibration so often set up in the float and the pounding of the valve, often so violent as to be audible throughout the house. The object of my invention is the construction of a ball cock which will be unable to pound, and which will in addition possess the advantages in simplicity of construction, and certainty in action hereinafter set forth.

In the drawings forming part of this specification, Fig. 1 is a side sectional view of a ball cock embodying my invention. Fig. 2 is a side view of the same but looking toward the opposite side. Fig. 3 is a plan view of the cock, showing a part thereof in section. Fig. 4 is a sectional plan view of the cock with portions of the operating parts in elevation. Fig. 5 is an end view of the valve and stem. Fig. 6 is a top view of a modification. Fig. 7 is a side view of another modification, which is the preferred form of my invention. Fig. 8 is a sectional side view of the same. Fig. 9 is a top view thereof, a part being in section.

The valve body 1 is joined by a union 2 to the supply pipe 3 in a well known manner. At the mid-length of the body 1 but above the center of the latter is located the valve controlling spindle 4, which is provided with a cam 5 for engagement with the extremity of the stem 6 of the valve 7. By turning the spindle in the proper direction, the cam 5 presses against the stem 6 and thereby moves the valve 7 from contact with its seat 9. The end 10 of the spindle 4 turns in a recess 11 in the body 1, but its other end portion 12 is enlarged and passes out through a snugly fitting opening 13 to the exterior of the body.

Upon the end of the enlarged portion 12 and projecting radially therefrom is an arm 14 by whose manipulation the valve is operated. For such manipulation, the body 1 is provided with a boss 15 rotatably bearing a screw 16, and upon this screw is mounted a cam 17, the latter and the screw being so threaded that the cam cannot be screwed quite into touch with the end of the boss 15. This cam is provided with a radially corrugated disk 19, against which is pressed a similarly corrugated disk 20 not internally threaded, but having a socket for receiving an end of the float arm 21. A thumb nut 22 binds the two disks immovable together to cause the cam 17 to swing with the float arm.

When, now, the float sinks downward owing to the emptying of the water from the tank with which the ball cock is connected, the cam 17 presses the arm 14 in a direction to cause spindle 4 and its cam-projection 5 to turn and move the valve 7 away from its seat, and thereby to permit the water to pass through the cock into the tank.

As the level of the water in the tank rises, the float arm 21 swings upward and the cam moves away from the arm 14, permitting the pressure of the water to return the valve to its seat. Occasionally, however, the float may sink so low as to cause the cam member 5 to become locked against the end of the valve stem and so prevent the water from being shut off. To prevent such possibility, I provide the cam with a finger 23, as shown in Figs. 2 and 3, adapted to clasp the farther surface 24 of the arm 14 and thereby to force the latter to swing with the cam 17. The surface 24 is given a convex curvature so that the finger 23 can freely move along the same as the two swing in unison but on different centers.

By unloosening the thumb nut 22, the float arm 21 can be adjusted to suit the depth of water desired in the tank, and the thickness of the washer 25 on the valve. The valve is prevented from being sucked into the supply pipe when the water is shut off at the meter or otherwise, by having its diameter greater than the interior of the supply pipe 3.

It will be noted that the finger 23 serves both to hold the arm 14 against the cam 17 when the float rises, and to lock the spindle 4 from coming out.

In the operation of this ball cock, the valve is held closed by the pressure of the water behind it, and cannot open until the water in the tank has sunk so low as to enable the weight of the float to open the valve. As the water flows into the tank and the level rises therein, the float permits the valve 7 to approach nearer and nearer its seat until a point is reached which permits the water-pressure in the supply pipe to suddenly overcome the buoyancy of the float and press the valve against its port or seat. Here the valve is powerfully pressed until the descent of the float has again overcome the same. It is therefore evident that the opening and closing of the valve is so positive an effort and has to be accomplished against such resistance as to render it impossible for the valve to open and close with such a rapid sequence as to produce the pounding found so objectionable in so many forms of ball cocks.

Fig. 6 differs from that above described, in having its arm 14' project from the spindle 4 out through a slot 18 into engagement with the cam 17.

In the construction illustrated in Figs. 7, 8 and 9, the spindle 4 is of uniform diameter throughout, and has a shoulder 26 between which and the end of its housing 27 is a leather washer 29 for preventing the escape of water thereat. Instead of the cam 5, I substitute a screw 30 which is tapped into the spindle 4 after the latter is in place, the outlet 31 permitting this to be easily done. This screw having an elongated head which engages the end of the valve stem 6 in much the same manner as the cam 5, forces the valve to open when the spindle is turned in the proper direction. To keep the spindle from coming out from its housing, the screw 30 is proportioned to pass entirely through the spindle and to engage a slot 32 within the housing, as indicated in Fig. 8.

For turning the spindle, an arm 33 depends from its outer end into contact with a cam 34 formed as a part of the member 19. Hence as the float arm 21 descends by the lowering of the water level in the tank, the cam 34 acts upon the arm 33, spindle 4 and screw 30 to press the valve away from the valve seat and so to permit the water to flow.

I prefer to form the valve as a cup 7 containing the leather washer 25, and to attach the same to the stem 6 by a screw 35; and to provide a removable valve seat in order to replace it when grooved or worn. For this purpose, a shell 36 is formed with an upturned flange 37 to form the seat, and a conical flange 39 adapted to be tightly clamped between the conical terminals of the valve body 1 and of the supply section 3 by the union 2, thus rendering the shell water-tight.

In the drawings, I have illustrated the cock as supported by an edge of the water tank, as 40 in Fig. 7, but I do not restrict myself thereto, inasmuch as the water supply section often is arranged to rise through the bottom of the tank.

What I claim is:

1. A ball cock comprising a valve seat, a valve adapted to be pressed into engagement with said seat by the water seeking to escape through the cock, a swinging arm adapted when swung in one direction to open the valve, a float arm pivotally carried by the cock, and a cam attached to said float arm and adapted to actuate said swinging arm to open the valve.

2. A cock comprising a body portion having a valve seat, a valve loosely supported in said body portion and coacting with said seat, a spindle rotatably supported by said body portion, and a screw projecting from said spindle and adapted for opening said valve, said body being formed with a housing closed at one end for said spindle, and this housing having a transverse groove entered by the inner end of said screw for holding the spindle in place.

In testimony that I claim the foregoing invention, I have hereunto set my hand this tenth day of June, 1921.

GEORGE W. NASH.